June 5, 1973     M. D. LEVITAN     3,737,359
LAMINATING MACHINE

Filed Jan. 25, 1971     3 Sheets-Sheet 1

INVENTOR.
MAURICE D. LEVITAN
BY
Molinare, Allegretti, Newitt & Witcoff
ATTORNEYS

INVENTOR.
MAURICE D. LEVITAN

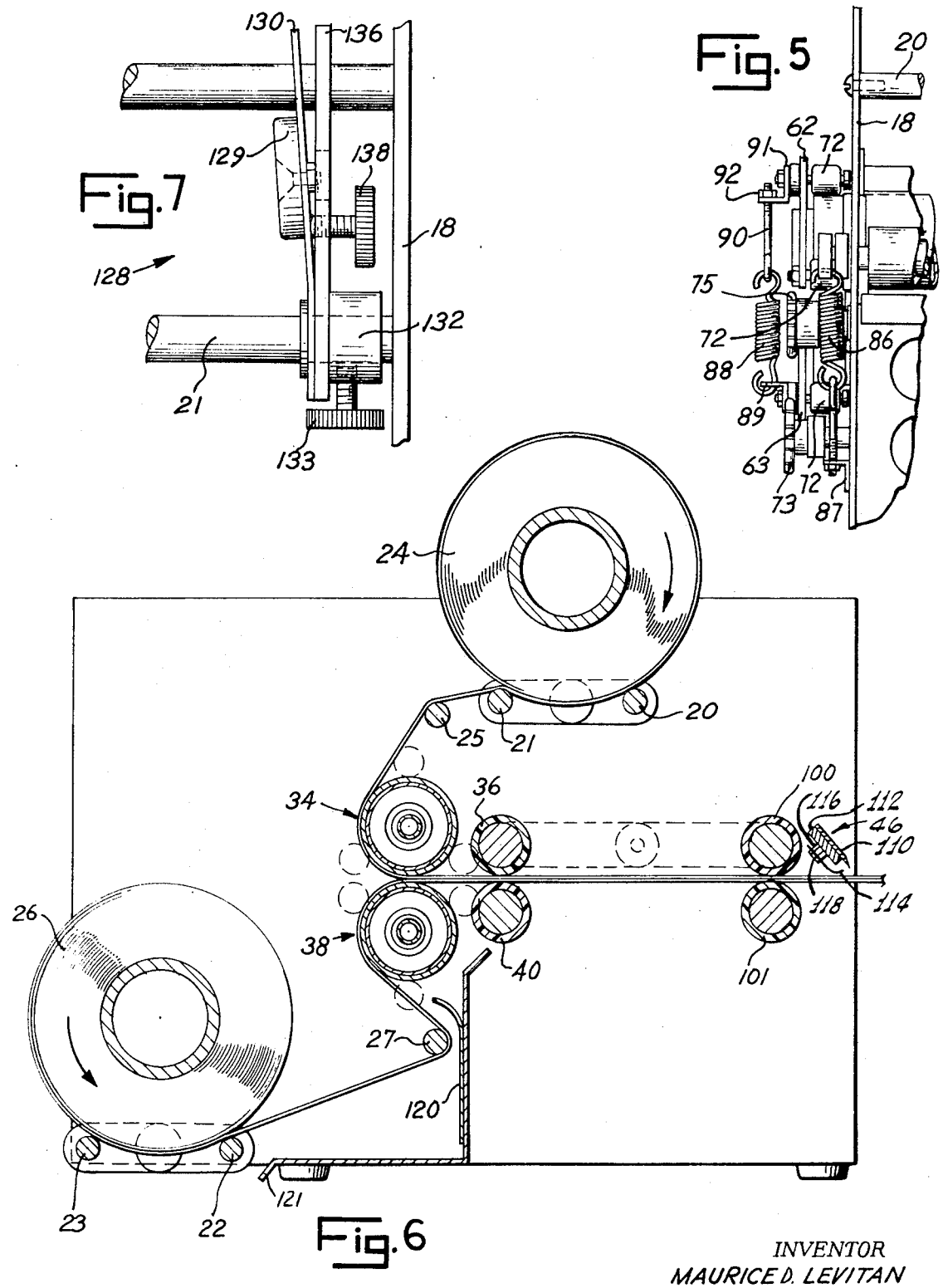

United States Patent Office 3,737,359
Patented June 5, 1973

3,737,359
LAMINATING MACHINE
Maurice D. Levitan, Wilmette, Ill., assignor to Thermal Laminating Corporation, Niles, Ill.
Filed Jan. 25, 1971, Ser. No. 109,100
Int. Cl. B32b 31/10, 31/18, 31/20
U.S. Cl. 156—522    9 Claims

ABSTRACT OF THE DISCLOSURE

A laminating machine including a pair of cooperating heater roller assemblies and a pair of cooperating pull rolls, which is characterized by the heater roll assemblies comprising a hollow metal tube rotatably supported in a laminating machine and a heater non-rotatably disposed within the hollow tube, with the hollow tube being supported at the ends in planetary bushings. Tear blade means are provided adjacent the pull rolls for severing the protected document from the film supply means, with the tear blade means including a stripper plate for separating the film from the tear blade. The supply rolls of film are each supported on a pair of cross-rods in the laminating machine and tensioning brake means are associated with each supply roll to assure maintenance of proper tension of the films, thereby resulting in a smooth wrinkle-free lamination of film to the document to be protected.

BACKGROUND OF THE INVENTION

This invention relates to laminating machines and more particularly, to improved laminating machines for enclosing a substrate, for example, a document made from paper, between protective and/or decorative plastic film.

Many types of laminating machines are known for enclosing substrates between protective film. The earliest laminating machine fused a thermoplastic or hot melt coated film to a substrate by passing the film and substrate between the nip of a heated roller and a resilient roller.

One more recent development in laminating machines is shown in Pat. 3,309,983, granted Mar. 21, 1967. The so-called heated shoe machine of this patent is best suited to heavy films, on the order of 0.003 inch or greater and it is difficult to laminate thin films with such device. This device is not practical for high-volume, low-cost production.

In Pat. 3,138,695, granted June 23, 1964, there is disclosed a laminating machine utilizing combination heating and pressing rolls covered with electrically conductive silicon elastomeric material. Heat is generated at the surfaces of said rolls. This type of device was found troublesome in general operation.

An infrared type laminator is disclosed in Pat. 3,143,454, granted Aug. 4, 1964, wherein the surface of the film is heated directly. Such device was found impractical and to my knowledge has never been marketed commercially.

An object of the present invention is to provide an improved laminating machine readily capable of rapid low-cost fabrication without expensive tooling, and which is constructed so as to facilitate loading and use of the machine, as well as maintenance and repair.

A further object of this invention is to provide an improved laminating machine incorporating a unique heater roll assembly including a hollow tube mounted in planetary bearings and a stationary heater, the hollow tube being open at the ends to obviate any undesirable oven effect that may result if the tube were substantially closed, such assembly simplifying electrical connections and minimizing parts.

Another object of the present invention is to provide an improved laminating machine constructed and arranged for quicker loading and threading of film than prior machines.

A further object of this invention is to provide a laminating machine of the type utilizing rolls of plastic film for sandwiching a document so as to protect same, with improved tear blade means including a stripper to enable separation of the laminated protected document from the plastic film supply rolls without sticking of the film to the tear blade means.

Yet another object of the present invention is to provide an improved laminating machine capable of handling heavy films and light films with equal facility by use of a unique pull roll construction that will maintain desired tension of the laminated web without resort to clutches or the like mechanism. Other objects and advantages of the present invention will be made more apparent hereinafter.

BRIEF DESCRIPTION OF THE DRAWING

There is shown in the attached drawing presently preferred embodiments of the present invention wherein like numerals refer to like elements in the various views and wherein:

FIG. 5 is a detail end view of the laminating machine illustrating the construction for biasing the respective pairs of heater roll assemblies and pull rolls toward one another;

FIG. 6 is a side elevational view of the laminating machine of FIG. 3 with housing parts removed to better show internal components of the laminating machine and illustrating a novel tear blade assembly; and FIG. 7 is a detail view of a modified brake means for adjusting tension on the film withdrawn from the supply roll.

DETAILED DESCRIPTION OF THE PRESENT INVENTION

Figure 1:
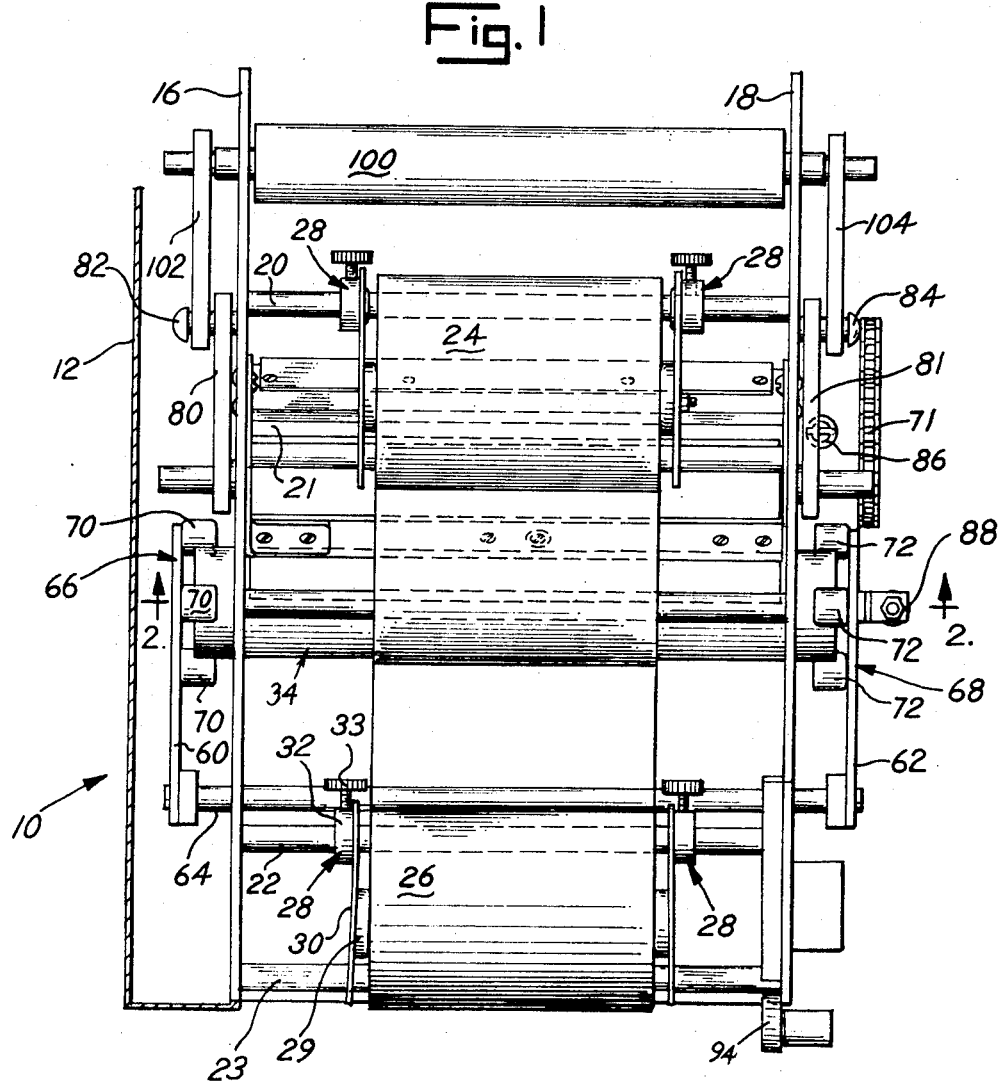
FIG. 1 is a plan view of an improved laminating machine embodying principles of the present invention, with the outer housing cut away and with components omitted for clarity.
Figure 2:
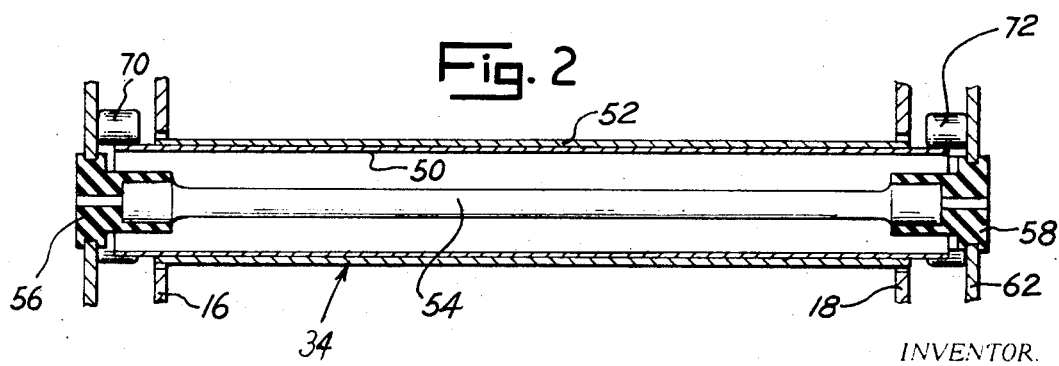
FIG. 2 is a cross-section view of the heater roll assembly taken generally along the line 2—2 of FIG. 1.
Figure 3:
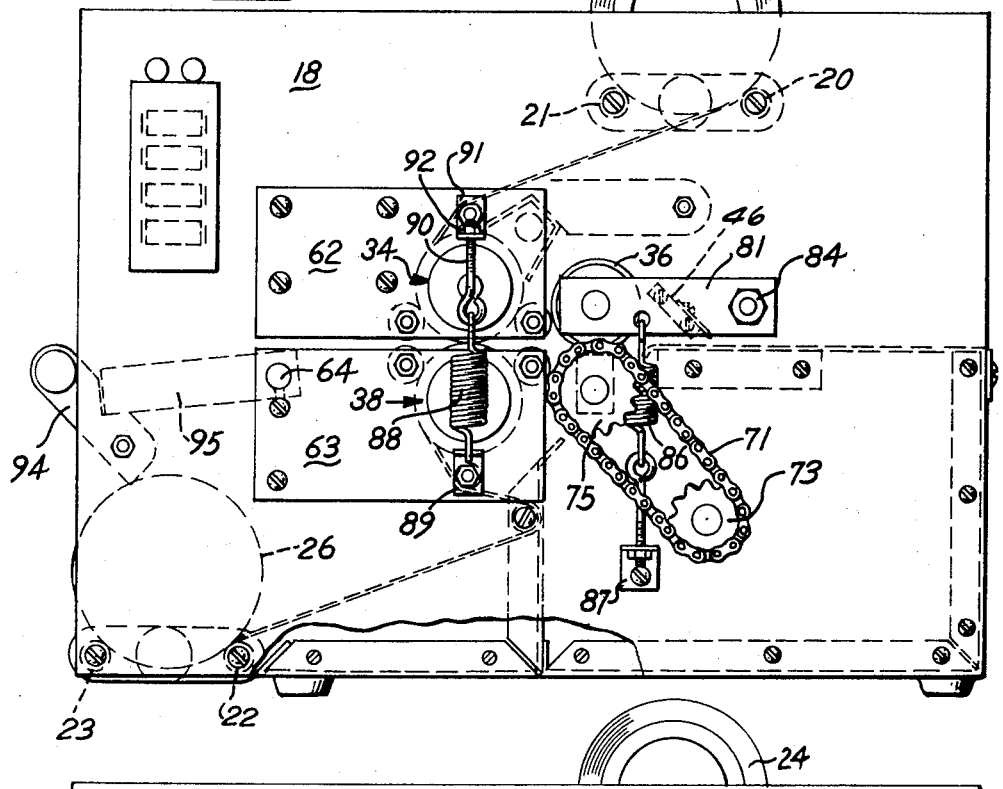
FIG. 3 is a side view of the improved laminating machine, with a pair of pull rolls removed so as to adapt the laminating machine for thin film.

Referring now to FIGS. 1 and 3, there is shown a laminating machine 10 which receives a substrate or document at the front end, and discharges from the rear end a document sandwiched between two layers of plastic protective film tightly bonded to the document. Typical documents are made from paper and include social security cards, driver's licenses, birth records, letters and the like. The laminating machine 10 includes an outer end housing 12 at each side enclosing frame means including a pair of spaced-apart end plates 16 and 18. The end plates 16 and 18 are held in spaced relationship by rod-like cross members 20-23, which are suitably affixed at the ends to the end plates.

A first supply roll 24 for plastic film is supported on top of cross members 20, 21 and a second supply roll 26 of plastic film is supported on top of cross members 22, 23. The plastic film may be of different commercial types. One type which performs well in the present device is "Mylar" coated with an adhesive. Associated with each supply roll are tension adjusting means 28 for controlling the tension of film drawn from the supply roll in use to maintain the films wrinkle-free when they are laminated to the document. Each tension adjusting means bears the numeral 28 and contains the same parts; therefore, the following description, though relating only to one, is applicable to all. The tension adjusting means 28 comprises a pressure pad 28 bearing against an end face of the supply roll. The pressure pad 29 is carried on leaf spring 30 that is cantilevered from hub 32. The hub 32 is adjustably carried on cross member or rod 22 and is adapted to be retained in selected adjusted position by thumb screw 33. Adjustment of the relative positions of the cooperating pairs of tension adjusting means 28 on the respective rods 20 and 22 performs two functions. First, supply rolls of film of different width can be accommodated, and secondly, the desired tension for a selected roll may be preset when the roll is installed in the laminating machine 10. A new supply roll can be readily put into position by releasing one tension adjusting means and sliding it axially on the cross member. The new roll rests on the associated pair of cross members and includes no spool or central shaft or like mounting structure.

Carried by the end plates 16 and 18 are pairs of rollers which cooperate during operation to laminate the film from each supply roll to the document fed into the front end of the laminating machine. Basically, film from the supply roll 24 is trained over heater roller assembly 34 and pull roll 36. Film from supply roll 26 is trained over heater roller assembly 38 and pull roll 40. A document to be protected is fed into the nip between the heater roller assemblies 34 and 38 and between the two layers of film. The films are heated by the heater roller assemblies 34, 38 and the pull rolls 36, 40 then cooperate with one another to cool the film and to apply pressure to the film to firmly bond the film and sandwich the document in place. The laminated document can be severed from the continuous films of plastic by lifting upwardly and tearing along the unique tear blade assembly 46 to be described more fully hereafter.

A feature of this invention is the construction and mounting of the heater roll assemblies 34 and 38. The assemblies are substantially identical and the following specific description of assembly 34 is applicable also to assembly 38. Assembly 34 comprises a hollow tube 50 made from a high thermal conductive metal. The tube 50 may be covered with a coating 52 made, for example, from a silicone elastomer or Teflon (polytetrafluoroethylene). If desired, the coating 52 can be omitted, particularly where heavy films are used. The heater 54, which preferably comprises a quartz tube having a resistance element such as a Nichrome wire therein electrically connected in a suitable electrical circuit, is retained at the ends in non-conductive retainers 56, 58. The retainers 56, 58, which can be made, for example, from silicone elastomer are secured in the support plates 60, 62 which are each carried adjacent one end on cross rod 64 journaled in the end plates 16, 18. Such retainers 56, 58 act as shock mounts for the heater 54. Suitable pig tails of conventional design are secured to the ends of the resistance element in the quartz tube to connect same into the electrical circuit of the laminating machine.

The hollow tube 50 is journaled externally at each end within planetary bearing means 66, 68 comprising three spaced-apart bearings, which preferably are thin-wall needle bearings. The bearings 70, 72, respectively, are affixed to the support plates 60, 62, respectively. Thus, it is seen that each heater roll assembly 34, 38 comprises basically a rotatably mounted metal tube and a stationary heater therein. The ends of the metal tube are open to obviate the oven effect in some prior known devices where the ends were substantially closed. Electrical circuit is simplified as a stationary connection can be made, rather than a sliding contact type connection, which would be required if the heater were rotatable.

A motor (not shown) attached to the end plate 16 is operatively affixed to the pull roll 40 for driving the pull rolls 36, 40. The motor output drives sprocket 73 connected to pull roll sprocket 75 by chain 71. Rotation of roll 40 in turn causes rotation of pull roll 36, which pull rolls are biased into operative engagement one with the other. Roll 36 is journaled in the end plates 16, 18, whereas the axle of roll 40 is journaled in levers 80, 81 that are pivoted on the pivot pins 82, 84 on end plates 16, 18. Means are provided on each side of the laminating machine 10 for biasing the pull rolls 36, 40 toward each other. As seen in FIGS. 3 and 5, a spring 86 is connected between lever 81 and bracket 87 for biasing the lever 81 downwardly as viewed in FIGS. 3 and 5 and, therefore, urging the two pull rolls 36, 40 into operative engagement so as to exert pressure on any laminated document passing therebetween, thereby firmly bonding the components of the lamination. It will be understood that there is a spring on each side of the laminating machine 10 for acting upon the respective levers 80 and 81. The cooperating rolls 36, 40 are illustrated as being solid; however, they can be hollow if desired. In one form of the invention the rolls 36, 40 are made from steel and have an elastomeric coating about 3/16 to 1/4 inch thick. The film carried on the rolls is less in width than the length of the rolls, and therefore, there is some frictional engagement of the rolls at both sides of the film carried thereon.

Biasing means are also provided for urging the heater roll assemblies 34, 38 into engagement so as to place an initial compression on the protective film on either side of any document fed into the nip between such assemblies. If desired, a screw adjustment may be provided between actuating lever 94 and lever 95 to maintain a slight gap between the heater roll assemblies 34, 38. This may be desirable in some applications of the laminating machine 10. Assembly 34 is journaled by bearings on support plates 60, 62 and assembly 38 is journaled by bearing on support plates 61, 63. The upper support plates 60, 62 are fixed relative to the end plates 16, 18, whereas the lower support plates 61, 63 are pivoted on rod 64. The spring 88 is connected at one end to bracket 89 and at the other end to eyelet 90, which is adjustably secured to bracket 91. Adjustment nut 92 may be rotated on the end of eyelet 90 in order to change the tension on spring 88 and thereby adjust the pressure applied between the heater roll assemblies 34, 38.

Actuating lever 94 is operatively secured to lever 95 for moving the support plates 61, 63 against the bias of springs 88 away from one another.

Figure 4:
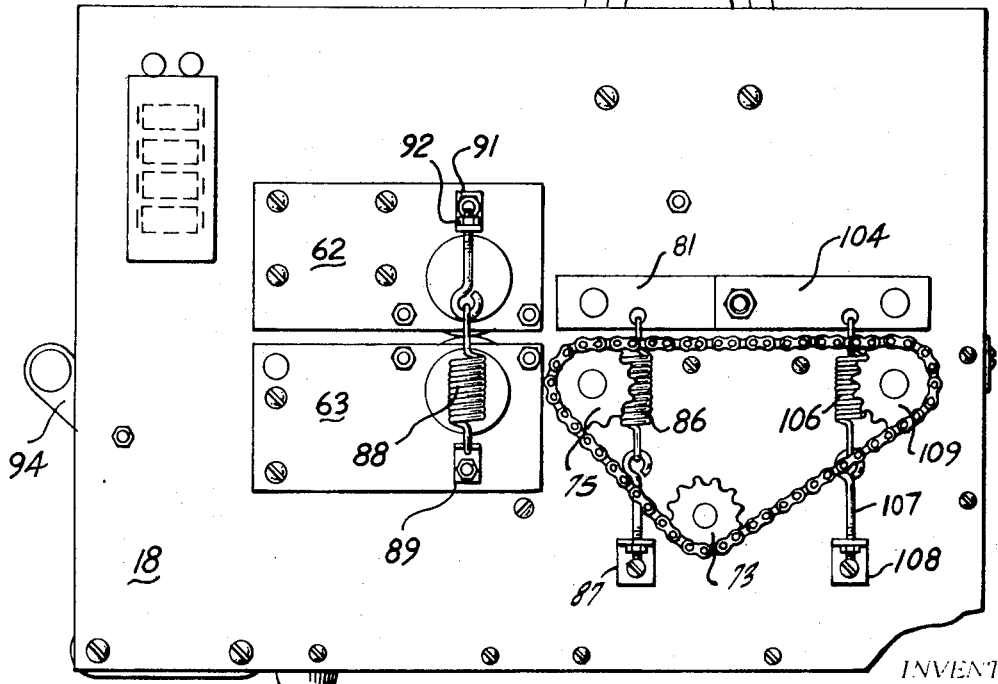
FIG. 4 is a side view similar to FIG. 3 of the laminating machine as shown in FIG. 1, for handling heavy film, with parts omitted for clarity.

In FIGS. 1, 4 and 6, there is shown a secondary pair of pull rolls or press rolls 100, 101 used when heavy film on the order of greater than 0.003 inch is to be applied to a document. It will be understood that the pull rolls 100, 101 can be omitted when only thin film is used in the laminating machine 10. The roll 100 is secured at its ends to levers 102, 104 pivoted on pivot pins 82, 84. The lower roll 101 is journaled in the end plates 16, 18. Thus, the upper roll is movable relative to the lower roll. Spring 106 is connected between lever 104 and eyelet 107 secured adjustably to bracket 108 on end plate 18 for biasing the two rolls 100, 101 toward one another. The chain 71 is trained over sprockets 73, 75 and 109 for driving the rolls 40 and 101, respectively, connected to the axles of rolls 40 and 101, respectively. The secondary pair of pull rolls provides an added cooling effect to the film passing thereover, which cannot be accommodated by the first pair of pull rolls alone on some occasions where heavy film is used. If desired, a fan can be positioned between the pairs of pull rolls to enhance cooling of the film.

To overcome problems in tearing a laminated document from the endless supply rolls of film, there has been provided a novel tear blade assembly 46. Such tear blade assembly includes a tear blade 110 carried on a fixed bracket 112 disposed between the end plates. The blade 110 is retained at a downwardly inclined angle as shown, on the order of 45 degrees. A longitudinally extended stripper plate 114 is resiliently affixed to the underside of the bracket 112 by means of spring 116 and retainer 118. There may be a spring and retainer at each end of the bracket 112 or additional springs and retainers may be used as desired. When the film is pulled upwardly against the tear blade 110, the stripper 114 rises or is biased against spring 116 to permit the film to be severed by the blade edge. After the film has been severed, the pressure of spring 116 forces the film away from the tear blade 110. The blade 110 may have a linear edge or the cutting edge may be serrated. The stripper 114 is particularly effective to prevent film material from lodging in a serrated tear blade after the laminated document has been removed.

The tear blade assembly 46 is disposed behind the rearmost rolls used. Thus in FIG. 3, the tear blade assembly 46 is behind rolls 36, 40 (when the device is used for light films), whereas in FIG. 6, the tear blade assembly is behind rolls 100, 101 (when the device is used for heavy films).

With reference to FIG. 6, it is seen there are guide means provided for facilitating threading of the film through the laminating machine and over the heater roll assembly 38. The guide 120 may comprise a transverse sheet having an upwardly and forwardly curved or angled portion. The guide 121 is formed from a downwardly and forwardly angled portion of the frame means. When relatively heavy rolls are used, film from the roll 26 is passed between transverse idler rod 27 and guide 120 and then over assembly 38. Similarly, film from roll 24 is passed over roller rod 25 and assembly 34. When relatively light rolls are used, film from roll 24 is passed under rod 21 and then over rod 25. Likewise, film from roll 26 is passed between rod 22 and guide 21 and then between rod 27 and guide 121. The latter threading helps to stabilize the rolls on their associated support rods.

Turning to FIG. 7, there is shown a modified brake or tensioning mechanism. Whereas mechanism 28 was essentially a pressure pad on a leaf spring, the tensioning mechanism 128 includes in addition an adjustment mechanism to permit selective adjustment of the pressure on a supply roll of film being retained. The modified tensioning mechanism 128 includes a hub 132 slidable on rod 21 and adjustably secured thereto by thumb screw 133. A rigid plate 136 is affixed to hub 132 and an adjustment screw 138 is threaded to the rigid plate 136 and adapted to bear against the leaf spring 130 so as to move the leaf spring 130 relative to rigid plate 136 and vary the pressure of the pressure pad 129 against the end of a supply roll. The tensioning mechanism 128 may be substituted for the mechanism 28, as desired.

There has been provided by the present invention an improved laminating machine that is relatively inexpensively fabricated and relatively simple to operate and maintain. Among special features of the improved laminating device are novel heater roll assemblies and mounting therefor and novel tear blade means with stripper.

While presently preferred foms of the present invention have been described for purposes of illustration, it will be appreciated that this invention may be otherwise embodied within the scope of the following claims.

I claim:

1. In a laminating machine comprising frame means, a pair of heater roller assemblies on the frame means biased toward one another, first and second supply means for film, said film being passed between said roller assemblies and arranged to receive a document to be sandwiched therebetween at the nip of said assemblies, a pair of cooperating pull rolls biased together for receiving the sandwiched document and bonding the film thereto, and tear blade means adjacent the pull rolls for severing a sandwiched document from the supply means, the improvement wherein each heater roller assembly comprises a hollow tube rotatably supported on the frame means, and a heater nonrotatably disposed within the hollow tube, the ends of the hollow tube being open to obviate an oven effect by the heater, and planetary bushing means for supporting the ends of said hollow tube, said planetary bushing means comprising spaced apart bearings extending inwardly from each side of the frame means so as to peripherally engage and retain the heater roller assembly at each end.

2. A laminating machine as in claim 1 wherein support plates are disposed at each end of the heater roller assembly, said planetary bushing means extending inwardly from each support plate and means for retaining the support plates in predetermined spaced-apart relationship.

3. A laminating machine as in claim 2 wherein there are three equally spaced-apart cylindrical bearings on each support plate.

4. A laminating machine as in claim 2 wherein one pair of support plates journalling a heater roller assembly is fixed relative to the frame means and a second pair of support plates is movable relative to the frame means, and means for actuating the second pair of support plates so as to move one heater roller assembly away from the other.

5. A laminating machine as in claim 4 including spring means at each side of the heater roller assemblies for biasing the heater roller assemblies toward one another, whereby the film passing over the heater roller assemblies is heated and a first compressive force applied to secure the film from each supply means to the document.

6. A laminating machine as in claim 1 wherein the tear blade means includes a transverse blade member supported adjacent the pull rolls on the side opposite the heater roller means and a stripper plate movable relative to the blade member and disposed between the laminated document to be severed from the film and the blade member, whereby the film will be separated from the blade member after the laminated document has been severed from the film.

7. A laminating machine as in claim 6 including spring retainers for supporting the stripper plate relative to the blade means, such spring retainers biasing the stripper plate away from the blade member.

8. A laminating machine as in claim 1 including means for tensioning the film supplied to the roller assemblies, said supply means being disposed on support means, and a tensioning mechanism at each end of the supply means including a spring-biased pressure pad bearing against the end of the supply means.

9. A laminating machine as in claim 8 wherein said tensioning mechanism includes a rigid member and a spring member, said pressure pad being carried on said spring member, and adjustment means between said rigid member and spring member for adjusting the pressure of the pressure pad against the supply means.

References Cited

UNITED STATES PATENTS

| 3,027,285 | 3/1962 | Eisner et al. | 156—522 |
| 3,404,057 | 10/1968 | Heiart | 156—522 |
| 2,765,605 | 10/1956 | Brelsford et al. | 83—143 |
| 3,453,169 | 7/1969 | Buck et al. | 156—552 |
| 1,944,022 | 1/1934 | Bundick et al. | 88—17 |
| 2,777,594 | 1/1957 | Krueger | 156—527 |

DANIEL J. FRITSCH, Primary Examiner

U.S. Cl. X.R.

83—111, 143; 156—543, 552, 555, 583